Patented Dec. 8, 1936

2,063,252

UNITED STATES PATENT OFFICE 2,063,252

VITREOUS ENAMEL AND METHOD OF MAKING SAME

Charles J. Kinzie, Niagara Falls, N. Y., assignor to The Titanium Alloy Manufacturing Company, New York, N. Y., a corporation of Maine No Drawing. Application February 9, 1934, Serial No. 710,563

3 Claims. (Cl. 106—36.2)

My invention relates to the production of colored vitreous enamels, and particularly to blue colored enamels made by incorporating therein a complex containing titanium compounds.

My invention is based upon my discovery that by heating certain combinations of enameling materials, all of which may originally be white or colorless, a blue colored ceramic product may be advantageously produced.

Such product may be in the form of a vitreous enamel coating or glaze on metal, or a ceramic base, or it may be produced and put into form suitable for use as a staining pigment for various applications such as in paints, etc.

The following example will serve to show how from colorless or white materials a blue colored vitreous coating may be produced.

A mixture is made of enameling materials as follows:—

| | Parts by weight |
|---|---|
| Sodium zirconium silicate* | 26.43 |
| Aluminum hydrate | 8.06 |
| Potash—feldspar | 9.20 |
| Quartz powder | 20.04 |
| Sodium nitrate | 3.50 |
| Borax | 32.50 |
| Fuorspar | 5.41 |
| Cryolite | 3.44 |
| Zinc oxide | 12.07 |
| White titanium oxide | 10.00 |
| | 130.65 |

*Sodium zirconium silicate preferably used in the above raw mix had approximately the following composition:

| | Per cent |
|---|---|
| Zirconium oxide ($ZrO_2$) | 56 |
| Silica ($SiO_2$) | 28 |
| Sodium oxide ($Na_2O$) | 14 |
| Others | 2 |
| | 100 |

When the raw materials have been weighed, they should be charged to a mixer and blended, and then smelted in a gas-fired furnace to a homogeneous melt and poured into cold water, thereby producing a frit having a light tan tone.

Such frit was prepared for enameling in the following manner (parts by weight):

100 parts of the frit were milled with 6 parts of enameler's clay and 35 parts of water to a degree of fineness such as represented by 5 grams oversize remaining on a 200 mesh sieve from a 100 c. c. sample of slip.

The enamel slip was then applied to a piece of sheet iron previously coated with a ground coating of enamel. After drying the film the piece was fired at 1550° F. for three minutes, removed and allowed to cool. The result was a vitreous opaque blue coating having a high lustre.

The calculated composition of this blue vitreous coating will be about as follows:

| | Per cent |
|---|---|
| Sodium oxide ($Na_2O$) | 9.01 |
| Potassium oxide ($K_2O$) | 0.97 |
| Calcium fluoride ($CaF_2$) | 4.63 |
| Cryolite ($Na_3AlF_6$) | 2.94 |
| Zinc oxide (ZnO) | 10.33 |
| Boric anhydride ($B_2O_3$) | 10.17 |
| Silica ($SiO_2$) | 32.06 |
| Aluminum oxide ($Al_2O_3$) | 8.66 |
| Zirconium oxide ($ZrO_2$) | 12.66 |
| Titanium oxide ($TiO_2$) | 8.57 |
| | 100.00 |

I believe that this result is caused by the formation of bluish colored particles in the enamel film by the crystallization or precipitation of some complex or combination of titanium, zinc and aluminum compounds originally present in the coating as practically colorless compounds.

The active constituents in the production of the blue coating appear to be the titanium, zinc and aluminum compounds.

Zirconium compounds are used to make the enamel opaque and apparently plays no part in the formation of the blue color for when I have omitted same and replaced with like amount of $SiO_2$ in the raw batch, the blue enameled article was still produced. In the absence of either aluminum or zinc or both, the titanium failed to produce the desired blue color.

By varying the amount of titanium and also by varying amount of either or both the other active ingredients the color may be varied from a light pea green to a dark blue grey tone as may be desired.

I have found that, by detaching the blue vitreous film and crushing and fine-milling same, a coloring pigment could be produced; also that, by preparing a mix considerably richer in each of these active constituents and roasting under proper conditions to develop to maximum extent the blue colored crystals or precipitates responsible for the blue color, there results upon grinding and milling same a useful and more powerful blue pigment material.

I claim as my invention:

1. In the method of making blue colored vitreous enamels, the steps for making the enamel slip which comprise smelting a row batch of enameling materials substantially in the following proportions in parts by weight: sodium zirconium silicate 26.43; aluminum hydrate 8.06; potash feldspar 9.20; quartz 20.04; sodium nitrate 3.50; borax 32.50; fluorspar 5.41; cryolite 3.44; zinc oxide 12.07; and white titanium oxide 10.00 to form a frit, and then milling said frit with clay and water to form the enamel slip.

2. An enameling or glazing composition which when smelted, milled and fired will form a blue colored vitreous product initially comprising in the raw batch the following ingredients substantially in proportions in parts by weight as follows: sodium zirconium silicate 26.43; aluminum hydrate 8.06; potash feldspar 9.20; quartz 20.04; sodium nitrate 3.50; borax 32.50; fluorspar 5.41; cryolite 3.44; zinc oxide 12.07; and white titanium oxide 10.00.

3. A blue colored vitreous enamel or glaze having approximately the following composition: sodium oxide 9.01%; potassium oxide 0.97%; calcium fluoride 4.63%; cryolite 2.94%; zinc oxide 10.33%; boric anhydride 10.17%; silica 32.06%; aluminum oxide 8.66%; zirconium oxide 12.66%; and titanium oxide 8.57%.

CHARLES J. KINZIE.